(12) United States Patent
Woestmann

(10) Patent No.: US 8,017,010 B2
(45) Date of Patent: Sep. 13, 2011

(54) DEVICE FOR FILTERING A LIQUEFIED SYNTHETIC MATERIAL

(75) Inventor: Stefan Woestmann, Sassenberg (DE)

(73) Assignee: Kreyenborg Verwaltungen und Beteiligungen GmbH & Co., KG (DE)

( * ) Notice: Subject to any disclaimer, the term of this patent is extended or adjusted under 35 U.S.C. 154(b) by 467 days.

(21) Appl. No.: 12/064,909

(22) PCT Filed: Jan. 10, 2007

(86) PCT No.: PCT/DE2007/000021
§ 371 (c)(1),
(2), (4) Date: Feb. 26, 2008

(87) PCT Pub. No.: WO2007/085220
PCT Pub. Date: Aug. 2, 2007

(65) Prior Publication Data
US 2008/0197061 A1      Aug. 21, 2008

(30) Foreign Application Priority Data
Jan. 24, 2006   (DE) .................. 10 2006 003 140

(51) Int. Cl.
*B01D 33/48* (2006.01)
*B01D 35/22* (2006.01)
*B01D 33/44* (2006.01)
*B28B 17/02* (2006.01)

(52) U.S. Cl. ............... 210/333.01; 210/393; 210/411; 210/108; 210/798; 210/330; 210/446; 425/197; 425/199

(58) Field of Classification Search ........... 210/333.01, 210/108, 393, 411
See application file for complete search history.

(56) References Cited

U.S. PATENT DOCUMENTS
2004/0026339 A1   2/2004 Hills
2005/0016914 A1*  1/2005 Middler et al. ............. 210/340

FOREIGN PATENT DOCUMENTS
| DE | 3840904 C1 | 12/1988 |
| DE | 10254022 A1 | 3/2004 |
| EP | 0798098 B1 | 12/1996 |
| WO | 2004026432 A1 | 4/2004 |

OTHER PUBLICATIONS

Plastverarbeiter, vol. 41, Mar. 1990, No. 3, Speyer, Germany (Translation of relevant portion of p. 132).

* cited by examiner

*Primary Examiner* — Nam Nguyen
*Assistant Examiner* — Benjamin Kurtz
(74) *Attorney, Agent, or Firm* — Patricia M. Mathers

(57) ABSTRACT

A device for filtering a liquid synthetic material. The device has a housing, a feed channel, a discharge channel, and backflow channels. The feed duct is subdivided into split-feed channels (2A, 2B). The cross-section of the orifice of the split-feed channels, where they open into the filter chambers, is smaller than the normal cross-section of the feed channels.

6 Claims, 9 Drawing Sheets

DEVICE FOR FILTERING A LIQUEFIED SYNTHETIC MATERIAL

BACKGROUND INFORMATION

1. Field of the Invention

The invention relates to a device for filtering a liquefied plastic material. More particularly, the invention relates to a device having a plurality of filters and filter chambers. More particularly yet, the invention relates to a device that enables cleaning of a filter without interrupting the production process.

2. Description of the Prior Art

A conventional device is described in DE 102 54 022 B4. The device described in this prior art reference is based on prior art, for example, according to EP 0 798 098 B1.

In the case of the known device according to EP 0 798 098 B1, at least two filter elements are arranged in the flow path of the liquid in corresponding filter chambers. The filter chambers are arranged on a filter slide that is movably positionable transverse to the flow direction. On the filtered side of the filter, a single connecting channel is provided, so as to hydraulically connect the filtered side of the two filter elements with each other.

This arrangement requires a long housing and a long filter slide bolt, and, thus, also a longer slide path. A longer slide path, in turn, requires a larger hydraulic cylinder arrangement and a sturdier design for all components that are connected to the hydraulic arrangement.

The conventional device disclosed in prior art reference DE 102 54 022 B4 is an attempt to achieve the largest possible filter surface with the smallest possible filter slide diameters. This object, which was the basis for the known device, is achieved by providing two filter-slide split channels in the filter slide for each filter chamber on the clean side of the filter. These split filter channels open from the filter chamber into the discharge channel.

Furthermore, the actual discharge channel is also divided into four housing split channels. Both the production position and the backflow position are realized in this device. The filter chamber may then be so adjusted by sliding the filter slide, so that a flow path is blocked from the filter chamber to the discharge channel and the backflow channel. This configuration of the filter results in an increase in pressure in the blocked filter chamber, which results in improved backflow.

It is apparent that this device achieves its aim, but is expensive to produce.

WO 2004/026432 A1, FIG. 10ff. disclose a device for filtering a liquid, particularly for apparatus that process plastic material. In this device, the feed channel is divided into a total of four split feed channels. This arrangement also enables a production position as well as a backflow position. By sliding the filter slide, it is possible to adjust the filter chamber so that the flow path is blocked between the filter chamber and the feed channel and the backflow channel. This configuration increases the pressure in the filter chamber, which results in improved backflow. This object is achieved, however, with a relatively long housing and, thus, also a relatively long filter slide. The slide path is consequently longer, which requires a larger hydraulic cylinder unit and more robustly built components that are used with such an hydraulic configuration.

BRIEF SUMMARY OF THE INVENTION

The object of the invention is to achieve the same goals achieved by the conventional prior art devices, but to provide a device that requires less cost to manufacture, i.e., to produce such a device that is less costly, yet provides all the positions of the filter slide that are possible with prior art devices.

This object of the invention is achieved by-providing a device for filtering liquid plastic having a plurality of split feed channels that feed into a corresponding plurality of filter chambers, whereby a filter slide enables the flow path between on or more of the split feed channels and the respective filter chambers to be regulated. The device according to the invention allows the flow path to be selectively blocked between one or more of the split feed channels, to allow the filter or filters in the corresponding filter chambers to be cleaned, without interrupting the production process. The filter device according to the invention has a housing, a feed channel, a discharge channel and backflow channels. The filter filters and filter chambers are disposed on a filter slide that is slidably positionable, so as to open a flow path from a feed channel to the filter chamber and block the flow path to the backflow channel or, vice versa, to block the flow path between the feed channel and the filter chamber and open the flow path from the filter chamber to the backflow channel. The feed channel is divided into split feed channels, one split feed channel leading to each filter chamber. The diameter of the split feed channel, where it opens into the filter chamber, is reduced, relative to the diameter of the major portion of the split feed channel. In other words, the split feed channel has a major diameter that reduces to a minor diameter, similar to the neck of a bottle, at the end of the channel that opens into the filter chamber. The diameter of the feed channel, that is, before it is split, and the diameter of the discharge channel are the same.

The starting point for the preceding description is a device for filtering a liquefied plastic material in which at least two filter chambers with their respective filter elements are arranged in the filter slide. It is known, for example, from DE 38 40 904 C1, to design a filter device such that the filter chambers are arranged in two filter slides, each of which is arranged in corresponding bore holes with a suction-tight fit, whereby a flow path is provided from these two filter chambers to a feed channel and a discharge channel. Additional flushing channels must also be provided, however, in order to achieve proper backflow flushing. This makes the device, which is actually a simple design, expensive to manufacture.

Another object of the invention, based upon the conventional device described in DE 38 40 904, is to manufacture this device with less cost, i.e., to produce it less expensively, yet to maintain all possible positions of the conventional prior art filter slide.

This object of the invention is achieved by providing the filter device described above, with the additional feature of splitting the feed channel into split feed channels, with the portions of the split feed channels that feed into the filter chamber being reduced in diameter, relative to the diameter of the major portion of the respective split feed channel. The diameters are dimensioned such, that when the outer edge of the channel orifice of the split feed channel opens at the extreme outer edge of the filter chamber, the filter slide blocks the flow path to the backflow channel.

It is possible with both configurations to have both filter elements in filtering use at the same time, i.e., with the plastic material flowing through the filters and the filters filtering out contaminants. It is possible with both configurations to slide the filter slides, such that one of the filter elements is blocked from the feed of plastic material and is in contact with the pressure side of the other filter, whereby, however, the flow-path to the backflow channel is still blocked. Finally, it is possible to then slide this filter element in such a way that it comes into contact with the backflow channel, so that the pressure of the other filter is applied to the dirty side of the filter that is to be cleaned. This pressure effectively removes dirt particles from the filter, which are then transported away from the unfiltered side of the filter and carried into the backflow channel.

BRIEF DESCRIPTION OF THE DRAWINGS

Exemplary embodiments of the invention are explained below using the drawings. The drawings show the following.

DETAILED DESCRIPTION OF THE INVENTION

Figure 1:
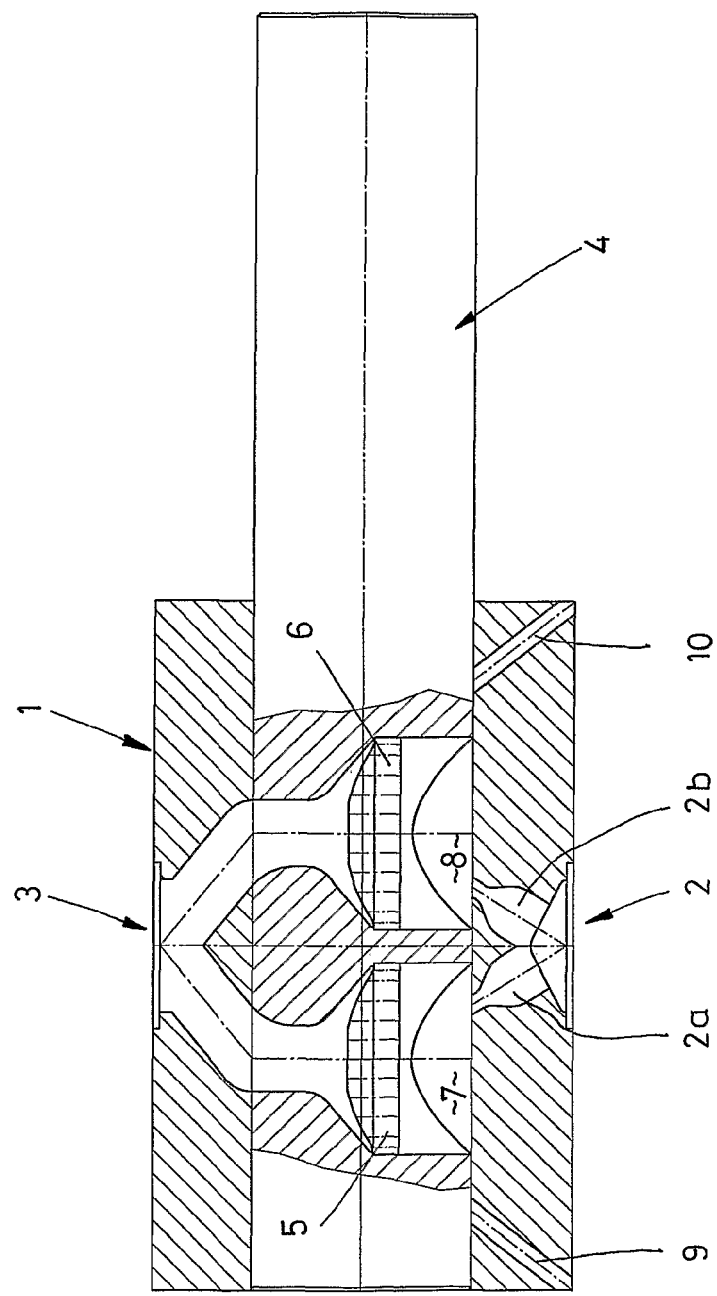
FIG. 1 illustrates a first embodiment of the filter device according to the invention, showing the filter slide positioned to allow flow from both split-feed channels and block flow into the backflow channels.

FIGS. 1 to 4 illustrate a first embodiment of a filter device for filtering molten or liquid plastic. The filter device has show a housing 1 with a filter slide 4, also referred to as a filter bolt, slidably disposed therein. The housing 1 has a feed channel 2 for feeding liquefied or molten plastic. The liquefied plastic flows through the filter device and then exits the housing 1 via a discharge channel 3.

Filter elements 5 and 6 are mounted in respective filter chambers 7, 8 that are provided in the filter slide 4. The plastic material flowing from the feed channel 2 to the discharge channel 3 is filtered and cleansed of impurities in these filter chambers 7, 8.

Backflow channels 9 and 10 are also provided in the housing.

The feed channel 2 is divided into a first split feed channel 2A and a second split feed channel 2B. The position of the filter chambers 7,8 relative to the split feed channels 2A, 2B is variable. In the position shown in FIG. 1, these two split feed channels 2A and 2B open into the filter chambers 7 and 8. A first cross-section $d_1$ of the split feed channel 2A or 2B, where it opens into filter chamber 7 or 8, is smaller than a second cross-section $d_2$ of the major portion of the split feed channel 2A and 2B. See FIG. 4.

Figure 2:
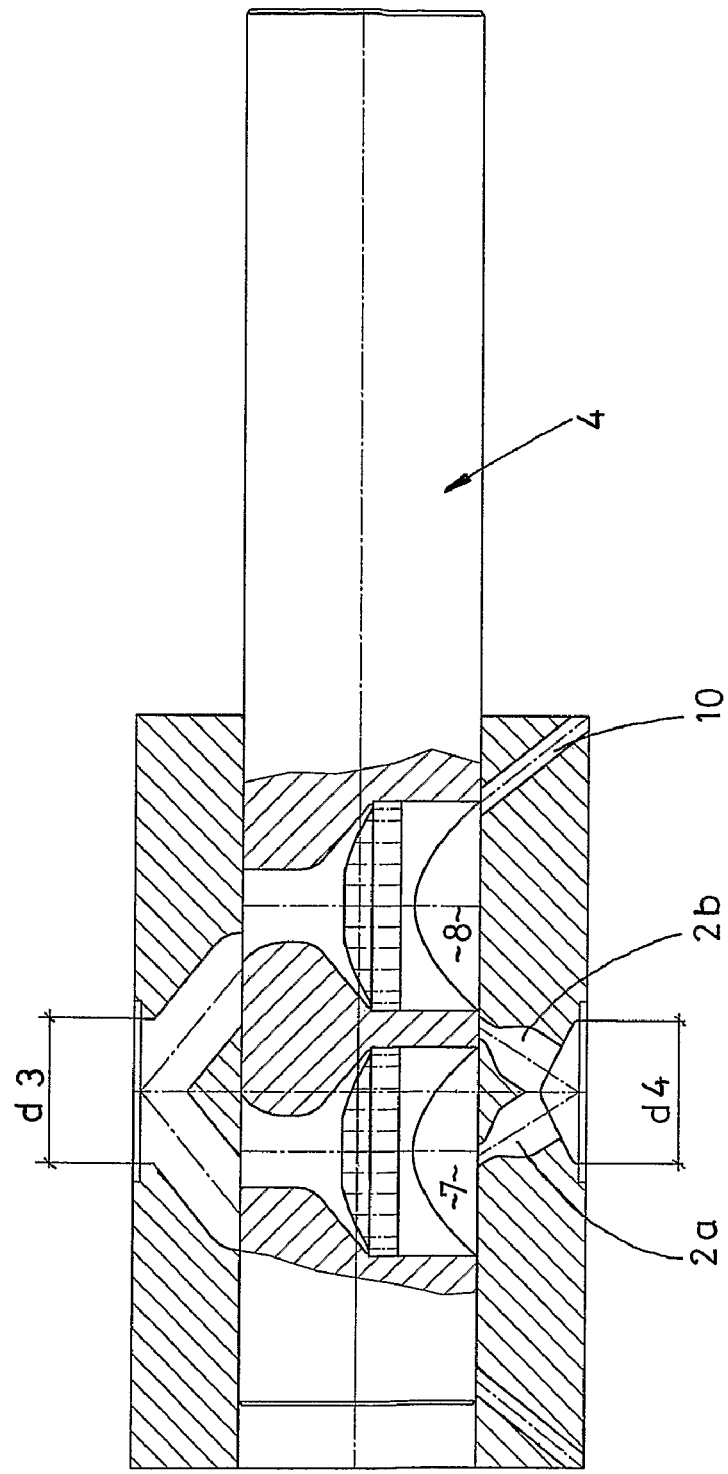
FIG. 2 illustrates the device of FIG. 1, with the filter slide repositioned to allow material feed from a first split feed channel into one filter chamber and block flow from that chamber into the backflow channel and to block flow from the second split feed channel into the other filter chamber and allow flow from the chamber into the other backflow channel.

FIG. 2 shows that a fourth cross-section $d_4$ of feed channel 2 is at least as large as a third cross-section $d_3$ of the discharge channel 3.

FIG. 1 shows both filter chambers 7, 8 charged with plastic material. The plastic material flows through the filter chambers, where it is cleansed of impurities, and the cleansed plastic material then flows off through the discharge channel 3.

Figure 3:
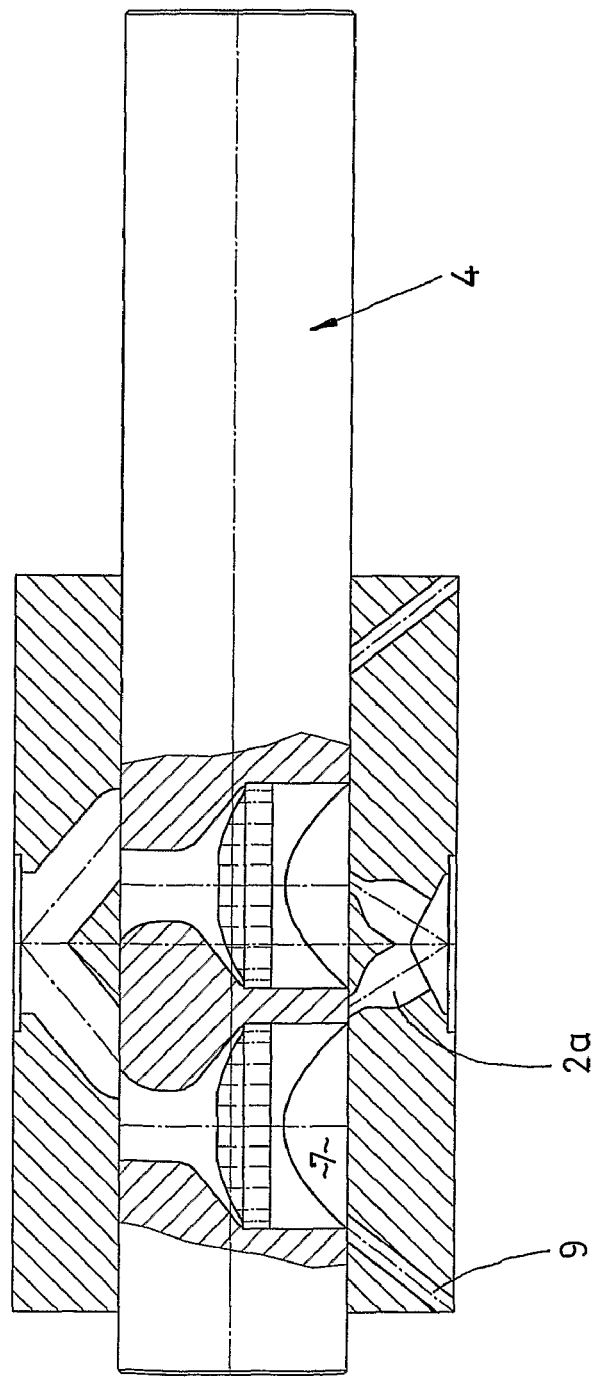
FIG. 3 illustrates the device of FIG. 1, with the filter slide repositioned opposite that shown in FIG. 2.

FIG. 2 shows a configuration in which the filter slide 4 is moved to the right, thereby closing off flow from the split feed channel 2B. The flowpath between the split feed channel 2A and the filter chamber 7 with the filter 5 is now open, as is the flowpath between the filter chamber 8 and the backflow channel 10. This effectively deflects the liquefied plastic stream, as is generally known, so that the solid particles deposited on the dirty side of filter element 6 can be removed. FIG. 3 shows a configuration in which the filter slide 4 is moved to the left, creating a corresponding position for filter chamber 7, in which, in this case, the split feed channel 2A is closed and the backflow channel 9 is open to the filter chamber 7.

Figure 4:
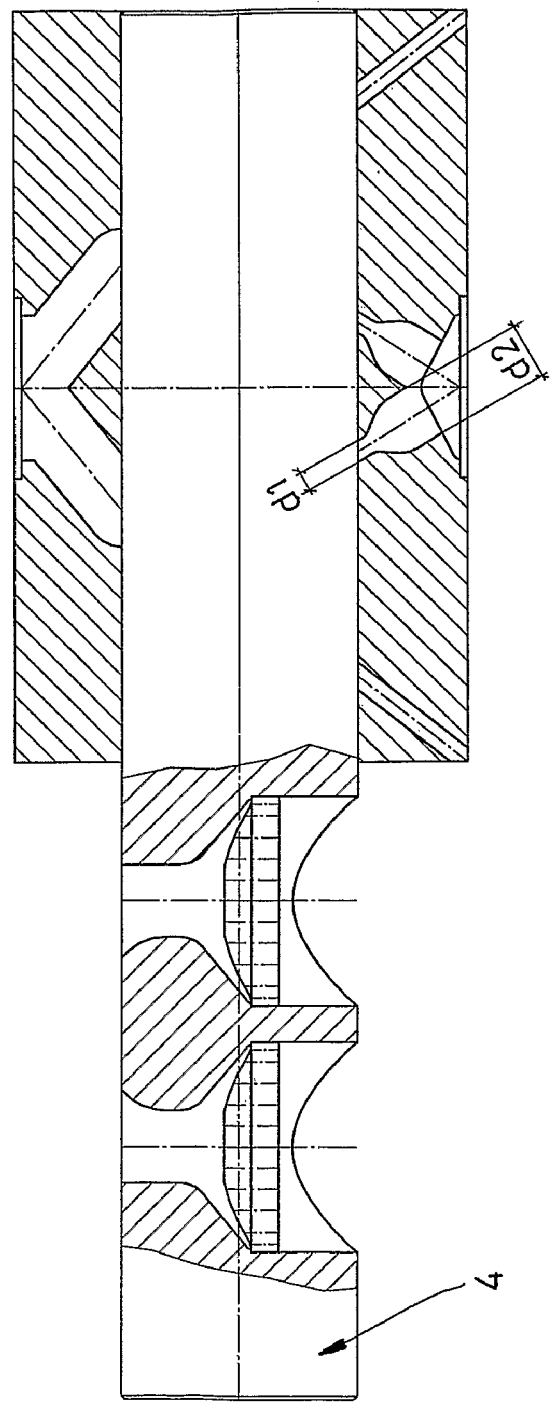
FIG. 4 illustrates the filter slide moved entirely to the left, to allow the filters to be changed, and also illustrates the narrowing at the orifice of the split feed channels.

FIG. 4 shows the position in which the filter slide 4 is slid completely to the left, so that both filters 5 and 6 can be changed.

Figure 5:
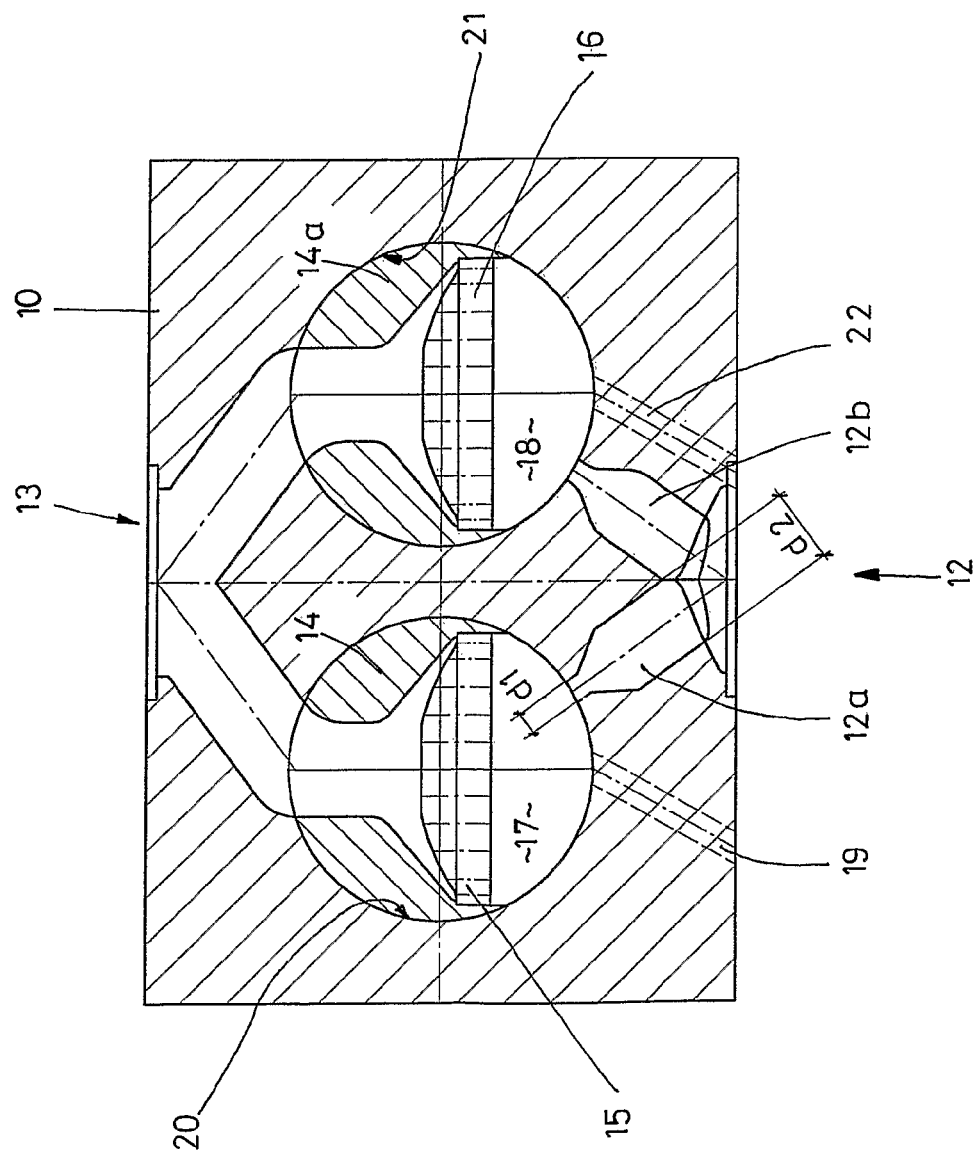
FIG. 5 illustrates a second embodiment of the filter device according to the invention, showing two filter bolts mounted side-by-side.

FIG. 5 shows a second embodiment of a device for filtering molten plastic material with a housing 10, a discharge channel 13, a feed channel 12, and two backflow channels 19 and 22.

The housing 10 has bores 20, 21 for receiving a filter slide 14 and 14A, respectively. Each filter slide 14, 14A is equipped with a filter element 15 and 16, respectively, which is arranged in a respective filter chamber 17 or 18.

Here, too, a feed channel 12 is divided into two split feed channels 12A and 12B.

Again, in this configuration, the first cross-section $d_1$ of the orifice of each split feed channel 12A and 12B is smaller at the entrance into the respective filter chamber 17 and 18, compared to the normal second cross-section $d_2$ of the split feed channels 12A and 12B.

Figure 6:
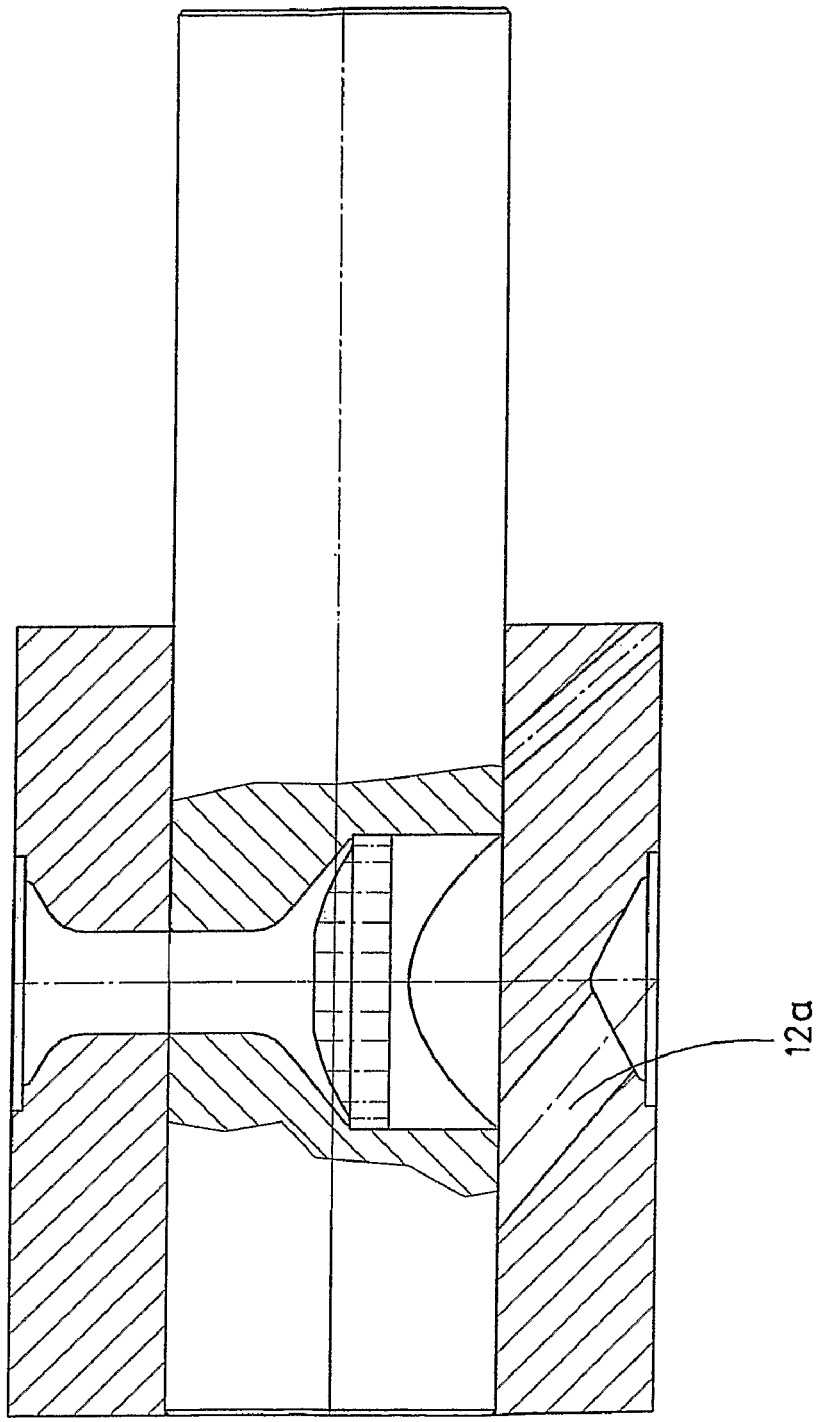
FIG. 6 illustrates a modified split-feed channel, in which the orifice end of the split feed channel is not narrowed, but the flow into the filter chamber controlled by adjusting the position of the filter slide.
Figure 7:
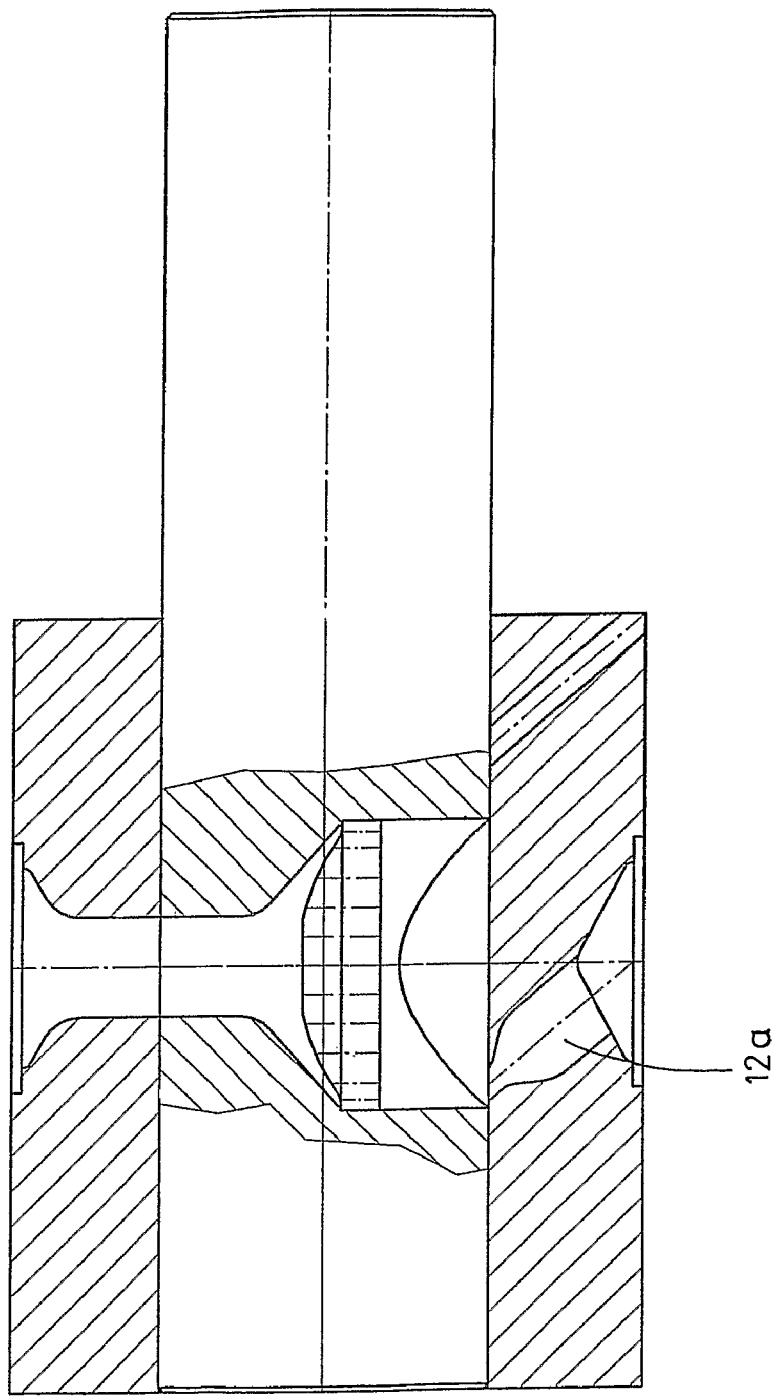
FIG. 7 illustrates a modified orifice of the split-feed channel.

The orifices of the split feed channels shown in FIGS. 1-5 and also in FIG. 7, are tapered like a bottle neck. It is entirely possible that the filter slide 4, 14, or 14A may simply be appropriately positioned, so as to narrow the orifice of the respective split feed channel in order to obtain the ratios $d_1$ and $d_2$. FIG. 6. shows the filter chamber placed such, that the flowpath from the split feed channel 12A into the filter chamber in considerably narrowed.

Figure 8:
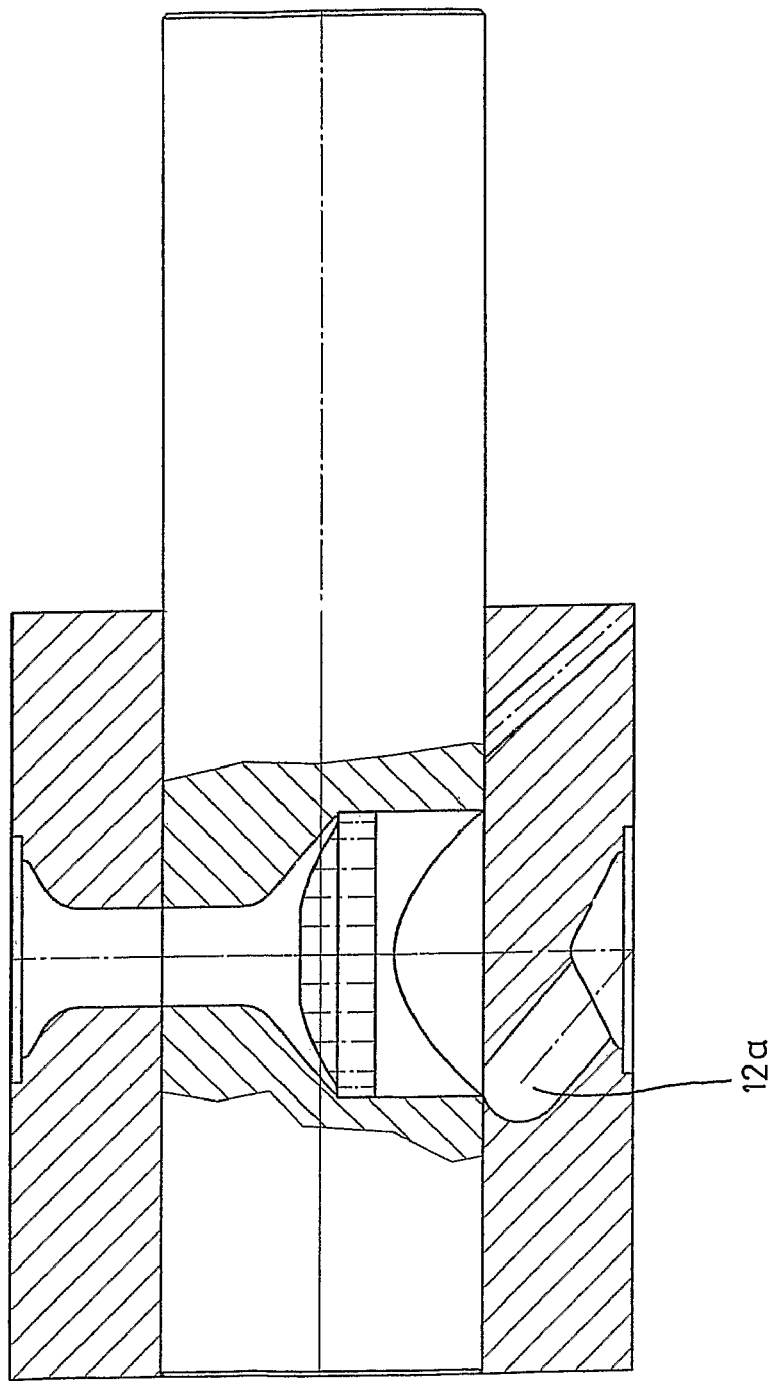
FIG. 8 illustrates a modified orifice of the split feed channel.

FIG. 8 shows another modified embodiment of the device for filtering molten plastic material, that allows for an appropriate narrowing of the cross-section. The type of cross-section narrowing essentially depends upon the viscosity of the plastic material.

Figure 9:
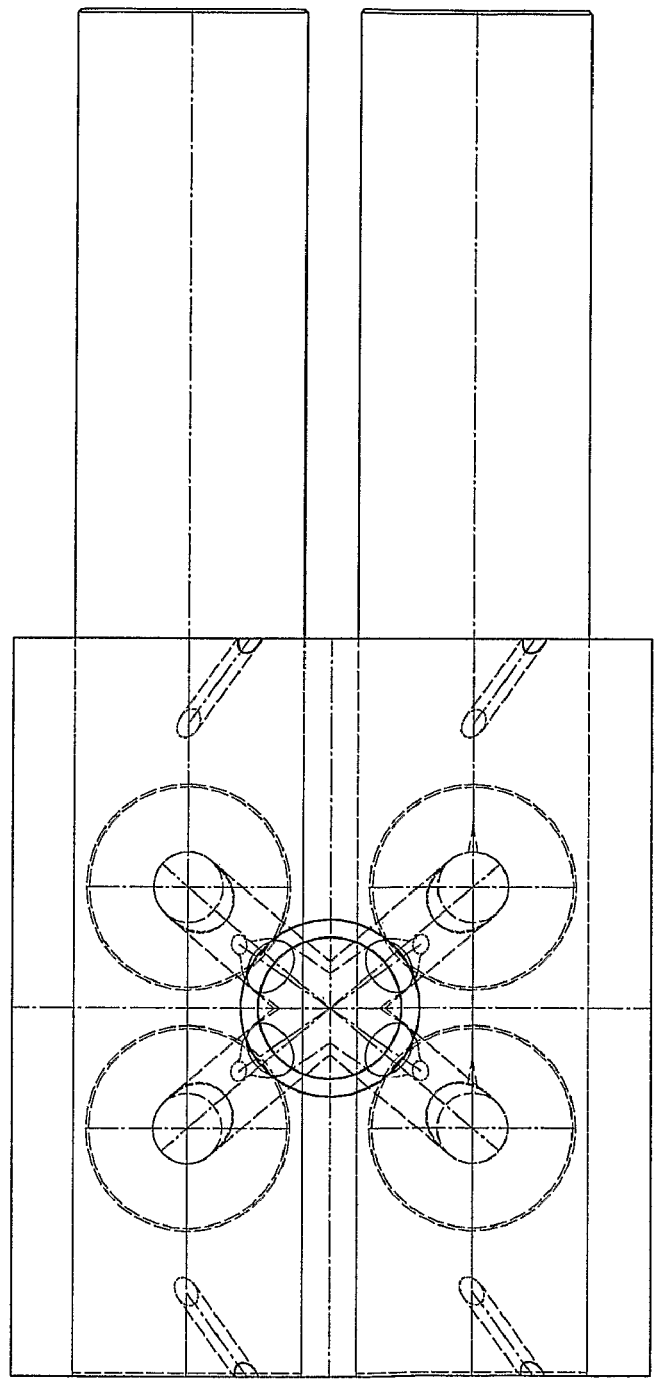
FIG. 9 illustrates the device of FIG. 1, having two filter slides and a total of four filter chambers.

Finally, FIG. 9 shows an embodiment of the device for filtering molten plastic, shown in FIG. 1, in which, however, a total of four filter chambers are created. This embodiment achieves a substantially increased performance, i.e., filter surface, in the simplest possible manner.

What is claimed is:

1. A device for filtering a molten material, said device comprising:
   a housing;
   a feed channel;
   a discharge channel;
   backflow channels; and
   a filter slide slidably arranged in said housing, said filter slide having at least two filter chambers, each filter chamber having a filter element;
   wherein said feed channel subdivides into split-feed channels that correspond in number to a number of said filter chambers, each split-feed channel having an orifice that opens into a corresponding one of said filter chambers, each split-feed channel having a minor diameter d1 at said orifice and a major diameter d2 of said split-feed channel, said minor diameter being smaller than said major diameter; and wherein, said filter slide is slidably movable in a direction transverse to a direction of flow of said molten material so as to selectively allow flow of said molten material from said orifice of said split-feed channel through said respective filter chamber to said discharge channel.

2. The device according to claim 1, wherein said discharge channel has a diameter d3 and said feed channel a diameter d4, said diameter d3 being at least equal to said diameter d4.

3. A device for filtering a molten material, said device comprising:
- a housing;
- a feed channel;
- a discharge channel;
- backflow channels; and
- a filter slide slidably arranged in said housing, said filter slide having at least two bores, each bore providing a filter chamber and each said filter chamber having a filter element;

wherein said feed channel subdivides into split-feed channels that correspond in number to a number of said filter chambers, each split-feed channel having an orifice that opens into a corresponding one of said filter chambers, each split-feed channel having a minor diameter d1 at said orifice and a major diameter d2 of said split-feed channel, said minor diameter being smaller than said major diameter; and wherein, said filter slide is slidably movable in a direction transverse to a direction of flow of said molten material so as to selectively allow flow of said molten material from said orifice of said split-feed channel through said respective filter chamber to said discharge channel.

4. The device according to claim 3, wherein, when an outer edge of said orifice of one of said split-feed channels, said outer edge being an edge farthest from a respective one of said backflow channels, opens at an outermost edge of said filter chamber, said filter slide closes a flowpath to said respective one of said backflow channels.

5. The device according to claim 3, wherein a length of said split-feed channel from said major diameter d2 to said minor diameter d1 is tapered, so as to form a tapered bottleneck at said orifice.

6. The device according to claim 3, wherein a length of said split-feed channel from said major diameter d2 to said minor diameter d1 is tapered, so as to form a tapered bottleneck at said orifice.

* * * * *